US008936819B2

(12) United States Patent
Perentes et al.

(10) Patent No.: US 8,936,819 B2
(45) Date of Patent: Jan. 20, 2015

(54) ACTUATOR FOR CLOSING A BEVERAGE INGREDIENT HOLDER AND METHOD OF USING SAME

(75) Inventors: Alexandre Perentes, Lausanne (CH); Enzo Bonacci, Savigny (CH); Patrick Caprotti, Forel/lavaux (CH); Andrew Gunstone, Echallens (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/232,449

(22) PCT Filed: Jul. 12, 2012

(86) PCT No.: PCT/EP2012/063660
§ 371 (c)(1),
(2), (4) Date: Jan. 13, 2014

(87) PCT Pub. No.: WO2013/007780
PCT Pub. Date: Jan. 17, 2013

(65) Prior Publication Data
US 2014/0170278 A1    Jun. 19, 2014

(30) Foreign Application Priority Data

Jul. 12, 2011    (EP) ..................................... 11173527

(51) Int. Cl.
*A47J 31/22*    (2006.01)
*A47J 31/40*    (2006.01)
*A47J 31/06*    (2006.01)

(52) U.S. Cl.
CPC ............ *A47J 31/407* (2013.01); *A47J 31/0673* (2013.01); *A47J 31/22* (2013.01)
USPC ........... 426/425; 426/429; 426/431; 426/432; 426/433; 426/435; 99/295; 99/302 R

(58) Field of Classification Search
CPC . A47J 31/369; A47J 31/3695; A47J 31/0673; A47J 31/3623; A47J 31/3628; A47J 31/3633; A47J 31/3638; A47J 31/3642; A47J 31/407; B65D 85/72; B65D 85/804
USPC ................ 426/425, 429, 431, 432, 433, 435; 99/295, 302 R
See application file for complete search history.

(56) References Cited

U.S. PATENT DOCUMENTS 2,451,195 A * 10/1948 Brown ............................ 99/295
3,713,377 A *  1/1973 Arnett et al. .................... 99/283
(Continued)

*Primary Examiner* — Anthony Weier
(74) *Attorney, Agent, or Firm* — K&L Gates LLP

(57) ABSTRACT

A receptacle holding unit (1) for a device for preparing a beverage from an ingredient contained in a receptacle (2) having: —a first part (10); —a second part (20) that is movable towards the first part, in particular along a longitudinal axis (1'), into a closed position for holding the receptacle in such unit and relatively apart from the first part into an open position for inserting the receptacle into such unit and/or for removal therefrom; —a fastening device (11, 21) having a fastened configuration for fastening together the first and second parts (10, 20) in the closed position and an unfastened configuration such to enable movement of the first and second parts out of the closed configuration; and —an actuator (30) movable between an open configuration and a closed configuration to drive the first part and the second part between the open and the closed positions. The actuator is movable along a straight axis (1') to drive the first part (10) and the second part (20) into the closed position and further movable along said axis (1') to actuate the fastening device (11, 21) from the unfastened configuration to the fastened configuration.

15 Claims, 6 Drawing Sheets

(56) References Cited

U.S. PATENT DOCUMENTS

| | | | |
|---|---|---|---|
| 5,638,741 A * | 6/1997 | Cisaria | 99/295 |
| 6,655,260 B2 * | 12/2003 | Lazaris et al. | 99/295 |
| 7,097,074 B2 * | 8/2006 | Halliday et al. | 222/85 |
| 7,231,869 B2 * | 6/2007 | Halliday et al. | 99/289 R |
| 7,255,039 B2 * | 8/2007 | Halliday et al. | 99/295 |
| 7,316,178 B2 * | 1/2008 | Halliday et al. | 99/295 |
| 7,513,192 B2 * | 4/2009 | Sullivan et al. | 99/289 R |
| 7,592,027 B2 * | 9/2009 | Halliday et al. | 426/433 |
| 7,607,385 B2 * | 10/2009 | Halliday et al. | 99/280 |
| 7,673,558 B2 * | 3/2010 | Panesar et al. | 99/295 |
| 8,109,200 B2 * | 2/2012 | Hansen | 99/295 |
| 8,495,949 B2 * | 7/2013 | Tinkler et al. | 99/285 |
| 8,567,304 B2 * | 10/2013 | Saxton et al. | 99/289 R |
| 8,609,170 B2 * | 12/2013 | Tinkler et al. | 426/431 |
| 2007/0163446 A1 * | 7/2007 | Halliday et al. | 99/279 |
| 2007/0175334 A1 * | 8/2007 | Halliday et al. | 99/279 |
| 2008/0264267 A1 * | 10/2008 | Doglioni Majer | 99/295 |
| 2010/0288132 A1 * | 11/2010 | Gavillet et al. | 99/295 |
| 2011/0126717 A1 * | 6/2011 | Gavillet et al. | 99/288 |

* cited by examiner

US 8,936,819 B2

ACTUATOR FOR CLOSING A BEVERAGE INGREDIENT HOLDER AND METHOD OF USING SAME

CROSS REFERENCE TO RELATED APPLICATIONS

The present application is a National Stage of International Application No. PCT/EP2012/063660, filed on Jul. 12, 2012, which claims priority to European Patent Application No. 11173527.0, filed Jul. 12, 2011, the entire contents of which are being incorporated herein by reference.

FIELD OF THE INVENTION

The field of the invention pertains to beverage preparation devices using receptacles, such as capsules, of an ingredient of the beverage to be prepared, in particular to devices arranged to prepare the beverage by circulation of a liquid into the ingredient receptacle and centrifugation thereof, typically to brew the beverage in the ingredient receptacle and extract the beverage therefrom.

For the purpose of the present description, a "beverage" is meant to include any human-consumable liquid substance, such as tea, coffee, hot or cold chocolate, milk, soup, baby food, etc. ... A "receptacle" is meant to include any container such as a packaging for containing a pre-portioned beverage ingredient, e.g. a flavouring ingredient, the packaging forming an enclosure, e.g. a capsule, of any material, in particular an airtight or pervious material, porous or non-porous material, e.g. plastic, aluminium, recyclable and/or biodegradable packagings, and of any shape and structure, including soft pods or rigid cartridges for containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use. Typically, such brewing devices comprise two parts relatively movable from a configuration for inserting/removing a capsule to a configuration for brewing the ingredient in the capsule. The actuation of the movable part of the brewing device may be motorized. Such a system is for example disclosed in EP 1 767 129. In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent injuries by squeezing. The actuation of the movable part of the brewing device may be manual. WO 2009/043630 discloses a beverage preparation machine including a brewing unit having a front part with a passage for inserting a capsule into the brewing unit. The front part is arranged to telescope out of the machine's housing for uncovering the passage for inserting a capsule into the brewing unit and telescopes into the brewing unit for sliding the passage under the housing and thus covering the passage by the housing. A pivotable arched handle is configured for driving the front part manually. WO 2005/004683 and WO 2007/135136 disclose a device comprising a frame, a fixed holding part for the capsule, a movable holding part which is mounted relative to the frame in a sliding relationship, one or two knuckle joint mechanisms that provide a mechanical system for closing in a steady and fluid-tight manner the holding parts about the capsule while also resisting to the counter-force acting while re-opening and generated by the internal brewing pressure, and a handle for directly levering the knuckle joint mechanism.

The preparation of a beverage by using centrifugation is also known. Such beverage preparation includes: providing a beverage (flavoring) ingredient, e.g. as powder and/or leaves, in a receptacle, e.g. in a capsule; circulating liquid into the receptacle and rotating the receptacle at sufficient speed to ensure interaction of the liquid with the ingredient while creating a gradient of pressure of liquid in the receptacle. Such pressure increases gradually from the centre towards the periphery of the receptacle. As liquid traverses the ingredient, e.g. coffee bed, extraction of the ingredient, e.g. coffee compounds, takes place and a liquid extract is obtained that flows out at the periphery of the receptacle. WO2008/148601 describes a possible example of a device using such centrifugal principle. In this case, the ingredient receptacle is a sealed capsule which is opened before its use. Hot water is fed in the centre of the capsule via a water interfacing part comprising a water injector aligned in the rotation axis. The receptacle is held in a capsule holder which is rotated by means of a rotary motor. Both the liquid interfacing part and the capsule holding part are mounted along roller bearings. The beverage is extracted from the capsule by a plurality of peripheral needles that creates openings through a lid of the receptacle. As the capsule is centrifuged about its rotation axis, hot water passes through the beverage ingredient, interacts with it to produce a liquid extract and the resulting liquid extract traverses, under the effect of the centrifugal forces, the peripheral openings and is projected against an impact wall of the collector. The liquid extract, thus constituting the beverage, is then drained through a beverage duct of the device and collected into a recipient such as a cup. WO2008/148650 further describes a device wherein a flow restriction is created downstream of the receptacle, in particular a capsule, for example, by a valve system which opens or enlarges under the pressure created by the centrifuged liquid leaving the receptacle. The valve system can be formed by a mobile restriction part of the device which is elastically urged against a rim portion of the capsule. U.S. Pat. No. 5,566,605 relates to a centrifugal type extraction cell having a deformable sealing joint for hot beverage preparation machine. The cell comprises a drum and a cover defining with the drum an internal volume. The cover is connected to the drum by attachment ears that engage in ramps. In these prior art devices, the water interfacing part which supplies the receptacle with water and the holding part which holds the receptacle are rotatable along frame portions of the device which are secured together by a closure mechanism such as a bayonet system or the like. The holding part is generally mounted on a frame part via at least one roller bearing. The liquid interfacing part is also generally part of a frame part also mounted along at least one roller bearing. When the device is rotated at high speed during centrifugation, the liquid extract creates important axial and radial forces which tend to separate these rotating parts.

A problem of the prior art devices comes from the difficulty to provide a closure of the device about the receptacle that properly resists to axial and radial forces created by the centrifugal pressure of the liquid. In order to maintain a sufficient closure that resists to the centrifugal pressure, a complex closure system is usually required that creates long tolerance chains for accurately holding the receptacle. Furthermore, due to the hydrostatic pressure present in the rotating receptacle, the axial forces tend to provide excessive loads on essential support means of the device such as the roller bearings. As a result, the bearings and other load support mechanical pieces of the device can wear prematurely. In order to prevent these problems, the device must be made more robust but this impacts on the cost of the device.

SUMMARY OF THE INVENTION

A preferred object of the invention is to alleviate one or more of the prior art drawbacks.

The invention relates to a receptacle holding unit and to a device including such a unit for preparing a beverage from at least one ingredient and dispensing such prepared beverage. For instance, the device is a coffee, tea, chocolate, cacao, milk or soup preparation machine. In particular, the device is arranged for preparing within a beverage processing module that includes the receptacle holding unit, a beverage by passing hot or cold water or another liquid through a receptacle held in the unit, such as a held capsule, containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 250 ml, e.g. the volume for filling a cup or mug, depending on the type of beverage. Formed and dispensed beverages may be selected from ristrettos, espressos, lungos, cappuccinos, café latte, americano coffees, teas, etc. . . . For example, a coffee machine may be configured for dispensing espressos, e.g. an adjustable volume of 20 to 60 ml per serving, and/or for dispensing lungos, e.g. a volume in the range of 70 to 200 ml per serving.

One aspect of the invention relates to a receptacle holding unit for a device for preparing a beverage from an ingredient contained in a receptacle, in particular by circulating a liquid into such receptacle and centrifugally driving such receptacle. This unit comprises: a first part; a second part that is movable towards the first part, typically along a longitudinal axis, into a closed position for holding such receptacle in such unit and relatively apart from the first part into an open position for inserting said receptacle into such unit and/or for removal therefrom; a fastening device having a fastened configuration for fastening together the first and second parts in the closed position and an unfastened configuration such to enable movement of the first and second parts out of the closed configuration; and an actuator movable between an open configuration and a closed configuration to drive the first part and the second part between the open and the closed positions.

In accordance with the invention the actuator is movable along a straight axis to drive the first part and the second part into the closed position and further movable along such axis to actuate the fastening device from the unfastened configuration to the fastened configuration.

Hence, the first and second parts and the fastening device can be driven and actuated, respectively by a single movement of the actuator along a single linear direction instead of having separate movements and/or directions. Moreover, successive respective driving and actuation of the first and second parts and of the fastening device can be achieved via the actuator whereby the driving effort and actuation required effort can be separated during the movement of the actuator. Hence, the effort that needs to be generated by the actuator can be spread in the closing and fastening process of the unit and localised effort peeks may be limited.

Thus, a single axial movement of the actuator can be sufficient to bring the first and second parts together and then bring the fastening device in the fastened configuration. Moreover, a single axial movement of the locking member may be appropriate to unfasten the fastening device and then to move the first and second parts apart. The actuator can be used for bringing the receptacle holding unit from a configuration for inserting and/or removing an ingredient receptacle to a configuration for processing the ingredient receptacle to prepare a beverage in a single axial straight movement.

Depending on the type of receptacle to be used in the receptacle holding unit, e.g. closed or partly closed receptacles, the unit may have a piercing device driven by the actuator for piercing such receptacle.

The actuator may be movable along the said straight axis to drive the piercing device for piercing the receptacle and then to drive the first part and the second part into the closed position.

Hence, the driving of the piercing device can be integrated in the same linear movement of the actuator as for driving and actuating the first and second parts and the fastening device. Likewise, the effort required for the piercing of the receptacle, the closing of the first and second parts and the fastening of the fastening device can be spread over the movement of the actuator.

For instance, the piercing device is assembled to and held by the second part. In such a configuration, the piercing device will be generally linked to the second part and generally follow the movement of the second part.

The fastening device typically has: a first engagement arrangement assembled to or integral with the first part, e.g. linked to the first part; a second engagement arrangement assembled to or integral with the first part, e.g. linked to the second part. The first and second engagement arrangements can be relatively rotated about the said axis when driven by the actuator moving along said axis for mutual engagement and disengagement of the engagement arrangements. In particular, relative rotation can be achieved via an axial/rotational movement conversion, such as a helical conversion, of the linear movement of the actuator. The first and second engagement arrangements may comprise first and second engagement surfaces, respectively. Such first and second engagement surfaces can be rotationally engaged together about the said axis when fastening device is in the fastened configuration and disengaged when the fastening device is in the unfastened configuration.

For instance, the first and second engagement surfaces are formed as helical surfaces or bayonet closure surfaces. The first and second parts may each bear one or more engagement surfaces and/or peripherally arranged surfaces. In particular, the engagement surfaces are peripherally arranged on the first and second parts about a seat for receiving the receptacle in the holding unit.

The first and second engagement surface are typically configured to match each other during the rotational engagement.

The first engagement surface may be formed by a protrusion or projection of the first engagement arrangement and the second engagement surface may be formed by an opening or recess in the second engagement arrangement, or vice versa.

Hence, mechanical connection and disconnection of the first and second parts can be achieved by relative rotation about the axis of rotation of the first and second engagement arrangements into and out of the connection configuration.

The first part bearing the first engagement arrangement may comprise a first index, in particular a plurality of first indexes. The second part can comprise an assembly of: a pre-positioning body that bears a second index, in particular a plurality of second indexes; and an engaging body that bears the second engagement arrangement and that is pivotally mounted to the pre-positioning body. In particular, the first index may cooperate with the second index for pre-orienting the second engagement arrangement relative to the first engagement arrangement to guide mutual engagement thereof at closure of the first and second parts. The engaging and the pre-positioning bodies are optionally angularly biased into a relative angular orientation for guiding the mutual engagement, in particular biased by one or more springs and/or other elastically deformable elements. Suitable springs include traction and compression springs, helicoidal and spiral and blade springs, discrete and integrated springs. In particular, a spring may be formed integrally with the engaging and/or pre-positioning body(ies), e.g. by moulding, or a spring may be formed as a separate component directly or indirectly assembled to the engaging and pre-positioning bodies.

The first and second parts may have angled first and second indexes, e.g. arrow and counter-arrow like indexes. Preferably, a plurality of indexes are provided corresponding to a plurality of angular pre-positionments for guiding the mutual engagements. Hence, proper relative angular positioning of the first and second parts can be achieved geometrically by the indexes by their interaction at closure.

As mentioned above, the receptacle holding unit may comprise a piercing device.

Such a piercing device may be assembled to and held by the second part, the device having at least one piercing element that is off the said axis and that is angularly fixed relative to the first part, and/or when present relative to the prepositioning body, about the said axis when the second engagement arrangement is pivotally moved relative to the first engagement arrangement about the said axis between the closed and open positions.

Between the open and closed positions, the piercing device can be angularly fixed to the per-positioning body about the said axis.

The piercing device may have a plurality of off the said axis piercing elements for piercing the receptacle. The piercing elements may be in an annular arrangement about the said axis and/or in a regular angularly spaced-apart relationship relative to the said axis. For example, the piercing elements are located at a peripheral part of the holding unit about this axis.

A second part that bears the off-axis piercing element and the second engagement arrangement that is pivoted relative to the first part with the first engagement arrangement will not lead to tearing the ingredient receptacle by off-axis rotation of the piercing element in the receptacle upon penetration. The first part and the piercing element of the second part can be angularly relatively fixed to prevent relative rotation between the first part and the piercing element while the receptacle is being pierced and penetrated by the off-axis piercing element.

The piercing device may have a axial piercing element extending along the said axis, such as a centrally located piercing element. The axial piercing element comprises in particular a channel for guiding a liquid into said receptacle and/or out thereof.

Liquid may be injected into the receptacle and/or drained out from the receptacle through the opening(s) formed by the axial and/or off-axis piercing element(s). For example, the liquid may be circulated into and/or from the receptacle via a channel located in the piercing elements and/or adjacent to the piercing element(s). One or more piercing elements may also be withdrawn from the receptacle to allow the passage of liquid via the opening(s) formed by the piercing element(s) in the receptacle.

The receptacle holding unit may comprise a locking device movable between a locked position for locking the fastening device in the fastened configuration and an unlocked position for unlocking the fastening device to unfasten the first and second parts. The actuator can movable along the said axis to actuate the fastening device into the fastened configuration and then to drive the locking device into the locked position. The actuator is in particular assembled to or integral with part of the locking device.

In one embodiment, the holding unit comprises a locking device associated with the first and second engagements arrangements of the fastening device to form a locking arrangement for locking the first and second parts together in the closed position.

When the fastening device includes first and second engagement arrangements rotatably cooperating together as discussed above, the locking device may be movable between:
   a locked position for preventing relative rotational movement of the first and second engagement arrangements when the parts are in the closed position; and
   an unlocked position for allowing relative rotational movement of the first and second engagement arrangements and engagement and disengagement thereof.

Typically, the locking of a relative rotation movement between the first and second engagement arrangements in the closed position prevents axial separation of the first and second parts, i.e. separation of the first and second parts along the direction of the axis of relative rotation.

The locking device can be actuated into the locked and/or unlocked position manually, e.g. by pushing or pulling the locking device, or automatically, e.g. by actuating the locking device by a motor typically via a mechanical transmission.

For instance, the locking device has a member that is arranged to intercept in the locked position at least the second part, e.g. the second engagement arrangement thereof, to prevent relative rotation of the second engagement arrangement in the closed position.

The locking member may be arranged to intercept in the locked position at least the above engaging body to angularly block: the engaging body; the above prepositioning body; and the first part, so as to prevent relative rotation of the first and second engagement arrangements.

Optionally, the locking member and the second part, e.g. the second engagement arrangement, having, respectively, a pin and an opening, or vice versa, the pin being arranged to enter the opening to lock the second part in rotation. Hence, the locking device can comprises an intercepting pin cooperating with an interceptable opening.

The locking member may be assembled to or integral with the actuator.

The locking member may be movable between the locking and unlocking positions along a direction generally parallel to the said axis.

The locking member may be configured to relatively drive the first and second parts into the closed and/or open position. Optionally, the locking member is arranged to be moved manually or automatically via a mechanical connection to a motor into the locking position and/or the unlocking position. The locking member can be arranged to move along a direction generally parallel to the said axis to drive the first and second engagement arrangements in the engagement or disengagement position, by an axial/rotational movement conversion such as a helical conversion.

Hence, the locking member, e.g. mounted on the actuator, can be driven in a single linear movement, along the axis of relative rotation of the first and second engagement arrangements, first to bring the first and second parts of the holding unit together and then to drive the engagement arrangements in relative rotation into the closed position. The locking member may be driven in a single linear movement, along the axis of relative rotation of the first and second engagement arrangements, first to disengage the engagement surfaces by relative rotation thereof and then to separate the first and second parts of the holding unit.

Moreover, the locking member may be located away from any receptacle in the holder unit, e.g. on the outside of the first and second parts, so that the locking member is not, or substantially not, exposed to any fluid or pressure rise associated with the processing of the receptacle in the holder unit. Thus, the locking member is not noticeably exposed to any change of condition and mechanical stress due to the processing circumstances of the ingredient receptacle.

In particular, the two parts may be arranged to undergo substantially no movements along the said axis during the processing of the ingredient receptacle, optionally, the two parts being arranged to be rotated about the said axis. Hence, in such a case, when the locking member is arranged to be movable along the said axis between the open and the closed positions, the first and second parts do not substantially move along this direction and do not interfere with the (locked) state of the locking member.

The actuator may be movable reversibly along the straight axis for actuation and driving of the first and second parts and the fastening arrangement reversely, and, optionally, when present, of the piercing device and/or of the locking device reversely.

The invention also relates to a beverage preparation device comprising a receptacle holding unit as described above.

Such a receptacle holding unit may be static or dynamic during beverage preparation. For instance, the receptacle holding unit is arranged to rotate, in particular at elevated speed, e.g. above 1000 or 2000 RPM, to enhance processing of the ingredient in the receptacle, in particular mixing thereof with a liquid circulated into the receptacle. In the latter configuration, the first and second parts move together during beverage preparation in a manner to be angularly fixed one to another about the axis of relative rotation. The axis of relative rotation may be the same as or different to the axis of relative rotation of the first and second parts into and out of the connection configuration.

Hence, the holding unit may be connected to an actuator for rotatably driving the unit to prepare a beverage. The first and second parts of the unit can be rotatably driven altogether (e.g. en bloc) about an axis that is generally identical to the said axis of rotational engagement and disengagement of the first and second engagement arrangements of a fastening device. The first or the second part may be actuatable by a motor to drive the unit altogether about the said axis. The actuated part preferably drives the other part in a direction of engagement of the first and second engagement arrangements.

The receptacle may be in the form of a capsule that has a flange, e.g. a rim, that can be secured inbetween the first and second parts. The capsule may have a body that is symmetric or asymmetric, conical or frusto-conical or cylindrical or spherical or hemispherical or frusto-spherical, containing the ingredient, e.g. ground coffee, tea or cacao or another beverage ingredient.

Another aspect of the invention relates to a use of a receptacle containing a beverage ingredient for such a beverage preparation device or for a receptacle holding unit described above.

BRIEF DESCRIPTION OF THE DRAWINGS

The invention will now be described with reference to the schematic drawings, wherein:

FIGS. 4, 5, 6, and 7 show a perspective side and top view of the unit in different configurations and partly cut away; and FIGS. 4a, 5a, 6a, and 7a illustrate part of the unit shown in FIGS. 4, 5 6 and 7.

DETAILED DESCRIPTION

FIGS. 1 to 7a illustrate an exemplary embodiment of a receptacle holding unit 1 and parts thereof in accordance with the invention.

Figure 4:
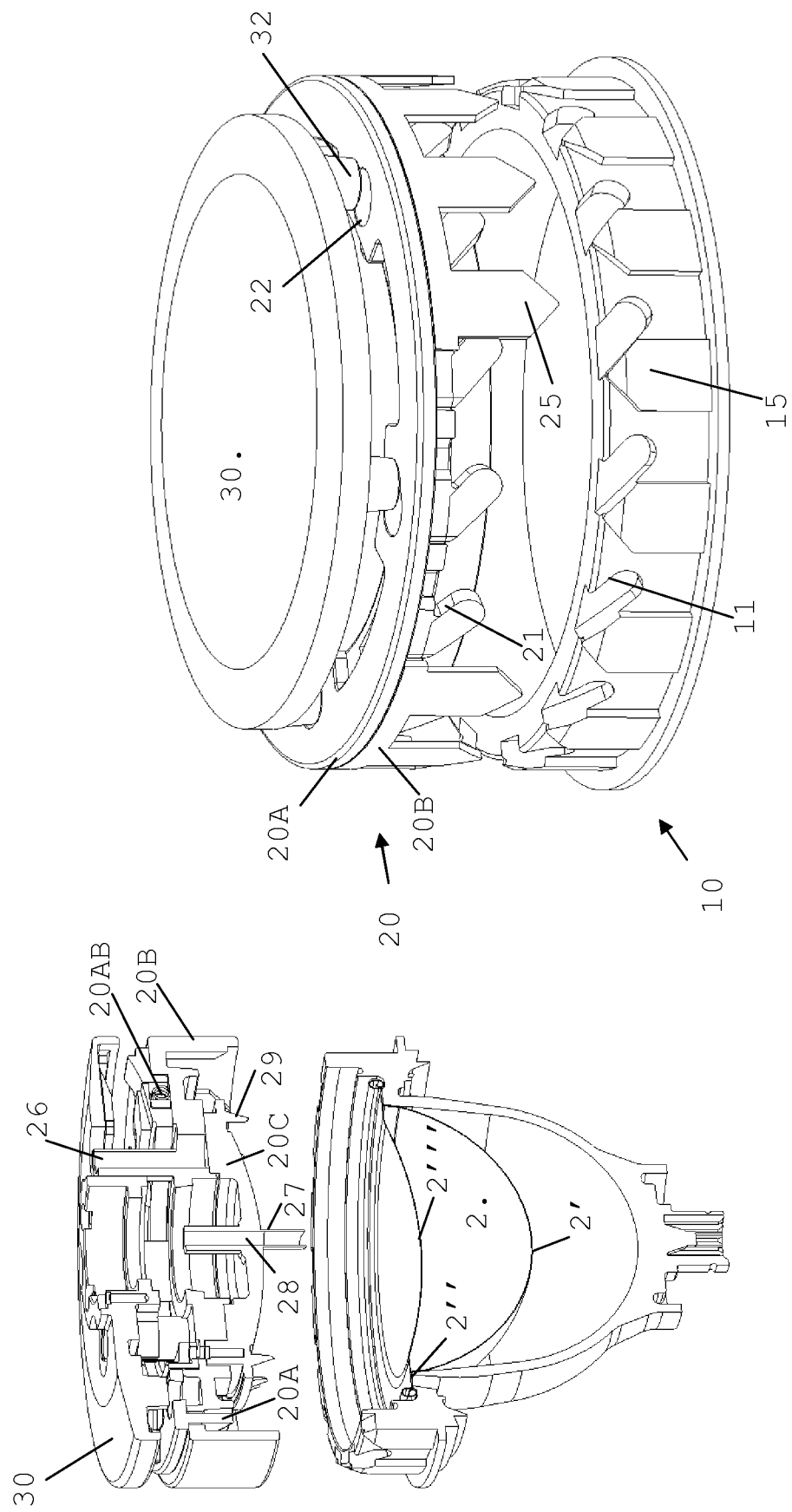

Receptacle holding unit 1 can be incorporated into an ingredient processing module of a beverage preparation device, typically of the centrifugal type, e.g. as disclosed in EP 2 000 062, EP 2 155 020, EP 2 152 128, WO 2008/148646, WO 2009/106175, WO 2009/106589, WO 2010/026045, WO 2010/026053 and WO 2010/066736. Unit 1 has a seat 5 for receiving and housing an ingredient receptacle 2, e.g. of the type disclosed in the same references or in WO 2008/148650, WO 2008/148834, WO 2010/066705, WO 2010/063644 and WO 2011/023711. The receptacle may be of the type described above under the header "field of the invention". Receptacle 2 may be a capsule that has a container-body 2', e.g. a generally cup-shaped or hemispherical or hemi-ellipsoidal body, having a rim or a flange 2" to which a cover lid 2''' is attached, in particular sealed, as illustrated in FIG. 4.

Unit 1 is usually configured to circulate a liquid into receptacle 2, typically for mixing with the ingredient, e.g. brewing the ingredient, contained in receptacle 2. A flavoured beverage may be prepared by circulating a carrier liquid, such as water, into the receptacle for mixing the carrier with the ingredient and form the beverage, e.g. by brewing. An automatic receptacle recognition system may be used to parameterize and adjust the processing of the ingredient automatically in line with the type of ingredient.

When closed or partly-closed receptacles 2 of flavouring ingredients, e.g. ingredient capsules, are used, unit 1 may include a receptacle opener 27,29 such as blades and/or a tearing tool. Alternatively, receptacle 2 may be a partly or fully self-opening capsule, e.g. under the effect of centrifugation and/or pressure of liquid circulated into receptacle 2. Receptacle 2 may be of the open-type, in which case no opener is needed. For instance, before use in unit 1, receptacle 2 has a lid 2''' that is entirely closed, or at least closed at its periphery facing openers 29 and pre-opened or liquid pervious in a central area facing opener 27. In the latter case, opener 27 can be omitted and replaced by a non-opening liquid feed channel.

Typically, a beverage preparation device comprising unit 1 of the invention further includes one or more of the following components:
- a) a fluid system in which unit 1 is in fluid communication;
- b) an in-line heater for heating a flow of liquid circulated through unit 1 or a batch heater for circulating heated liquid from the batch heater to unit 1;
- c) a pump for pumping liquid to unit 1, in particular a low pressure pump e.g. within the range of 1 to 5 bar, such as 1.5 to 3 bar;
- d) a motor for driving unit 1 in rotation during beverage preparation;
- e) an electric control unit, in particular comprising a printed circuit board (PCB), for receiving instructions from a user via an input user-interface and for controlling the heater, pump and motor; and/or
- f) one or more sensors for sensing at least one characteristic selected from characteristics of fluid system including unit 1, the heater, the pump, a liquid tank, an ingredient collector, a flow of the liquid (e.g. by a flowmeter), a pressure of the liquid and a temperature of the liquid, and for communicating such characteristic(s) to the control unit.

Moreover, receptacle holding unit 1 is typically associated with a beverage collection and dispensing system, e.g. as disclosed in WO 2009/106175 and WO 2010/089329.

Receptacle holding unit 1 typically comprises: a first part 10; a second part 20 that is movable towards the first part, in particular along a longitudinal axis 1', into a closed position (FIGS. 6 and 7) for holding receptacle 2 in unit 1 and relatively apart from first part 10 into an open position (FIGS. 1 and 4) for inserting receptacle 2 into unit 1 and/or for removal of receptacle 2 from unit 1; a fastening device 11,21 having a fastened configuration for fastening together the first and second parts 10,20 in the closed position and an unfastened configuration such to enable movement of first and second parts 10,20 out of the closed configuration; and an actuator 30 movable between an open configuration (FIG. 4) and a closed configuration (FIG. 6) to drive first part 10 and second part 20 between the open and the closed positions.

First part 10 may have a cavity 10' for containing receptacle 2 and second part 20 may form a lid or cover over cavity 10'.

In accordance with the invention, actuator 30 is movable along a straight axis 1' to drive first part 10 and second part 20 into the closed position and further movable along said axis 1' to actuate the fastening device 11,21 from the unfastened configuration to the fastened configuration.

In a particular, second part 20 can be movable towards first part 10 along straight axis 1'.

For instance, actuator 30 may be linked to second part 20 and freely separable from first part 19 in the open configuration. Alternatively, actuator 30 may be mounted in a guiding arrangement (not shown), e.g. guiding rails or slots with end-of-movement stoppers, for guiding actuator between the open and closed configurations so that first and second parts 10,20 and actuator 30 are permanently mechanically linked together during the normal use of unit 1 (excluding servicing or repairing operations involving a dismantling of unit 1).

In the illustrated particular embodiment, unit 1 has a piercing device 20C driven by actuator 30 for piercing receptacle 2. Actuator 30 may be moved along straight axis 1' to drive piercing device 20C for piercing receptacle 2 and then to drive first and second parts 10,20 into the closed position. Piercing device 20C can be assembled to and held by second part 20.

Fastening device 11,21 can have: a first engagement arrangement 11 assembled to or integral with first part 10; and a second engagement arrangement 21 assembled to or integral with second part 20. First and second engagement arrangements 11,21 can be relatively rotated about axis 1' when driven by actuator 30 moving along axis 1' for mutual engagement and disengagement of engagement arrangements 11,21 in particular via an axial/rotational movement conversion such as a helical conversion. First and second engagement arrangements 11,21 may comprise first and second engagement surfaces, respectively, these first and second engagement surfaces being rotationally engaged together about axis 1' when fastening device 11,21 is in the fastened configuration (FIGS. 6a and 7a) and disengaged when the fastening device is in the unfastened configuration (FIG. 5a).

First and second engagement surfaces may be formed as generally matching helical surfaces as illustrated in the appended Figures. Alternatively, these surfaces may be formed as bayonet closure surfaces. In the illustrated embodiment of unit 1. First and second engagement arrangements 11,21 each bear a plurality of engagement surfaces peripherally arranged about receptacle seat 5.

As illustrated by way of example, the second surfaces can be formed by helical fingers that protrude from second engagement arrangements 21. The first surfaces may be formed as corresponding openings or recesses of first engagement arrangements 11 substantially matching the shape of the fingers. Other shapes of engagement surfaces are also contemplated.

Hence, mechanical connection and disconnection of first and second parts 10,20 can be achieved by relative rotation about axis 1' of the first and second engagement arrangements 11,21 into and out of the closed configuration, as shown in the sequence illustrated in FIGS. 4, 5, 6 and 7.

First part 10 bearing first engagement arrangement 11 may comprise a first index 15, in particular a plurality of first indexes. Second part 20 can comprise an assembly of: a pre-positioning body 20B that bears a second index 25, in particular a plurality of second indexes; and an engaging body 20A that bears second engagement arrangement 21 and that is pivotally mounted to pre-positioning body 20B. First index (es) 15 cooperate with second index(es) 25 for pre-orienting second engagement arrangement 21 relative to first engagement arrangement 11 to guide mutual engagement thereof at closure of first and second parts 10,20.

Figure 1:
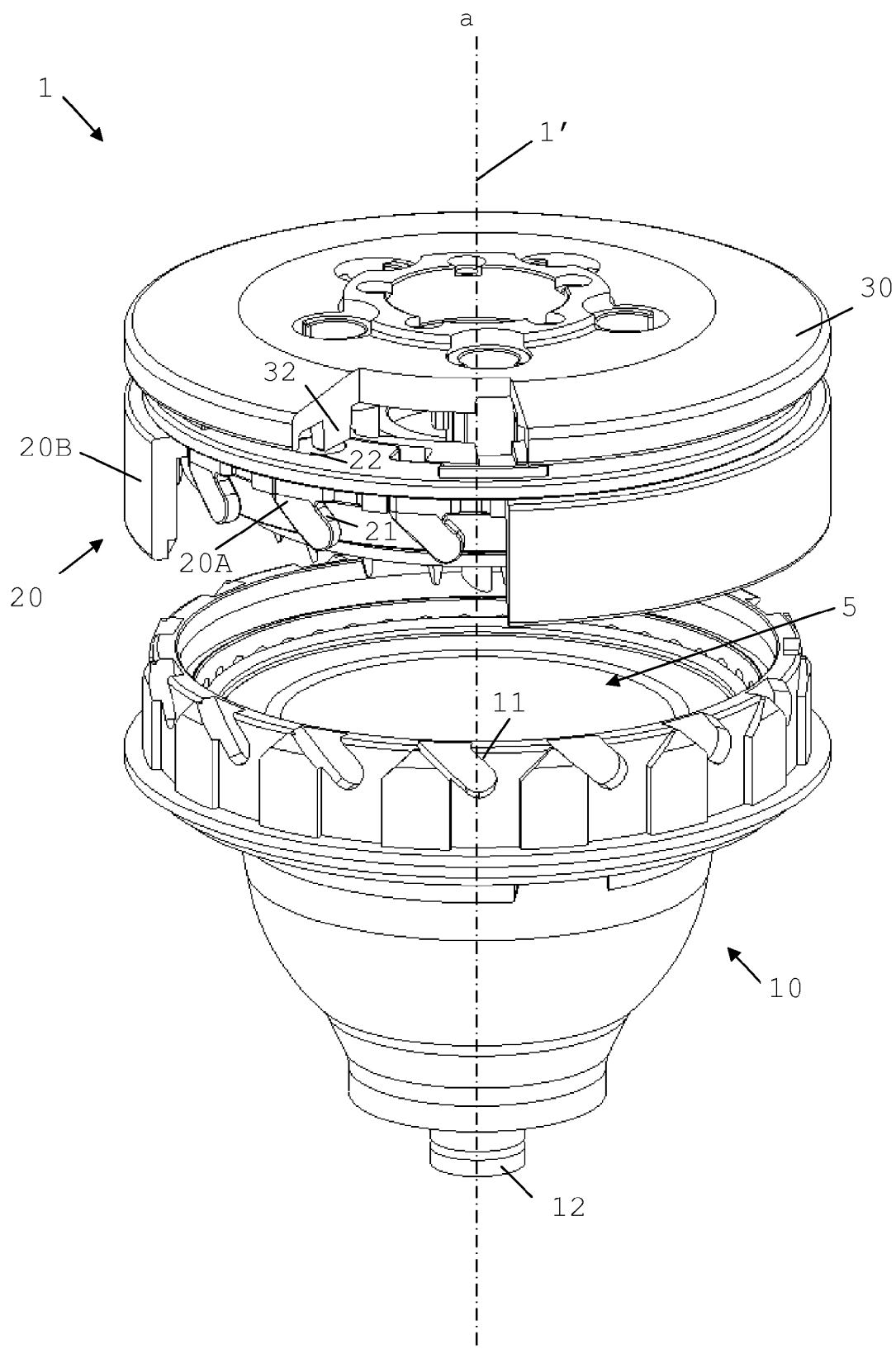
FIG. 1 shows a perspective side and top view of a receptacle holding unit according to invention.
Figure 2:
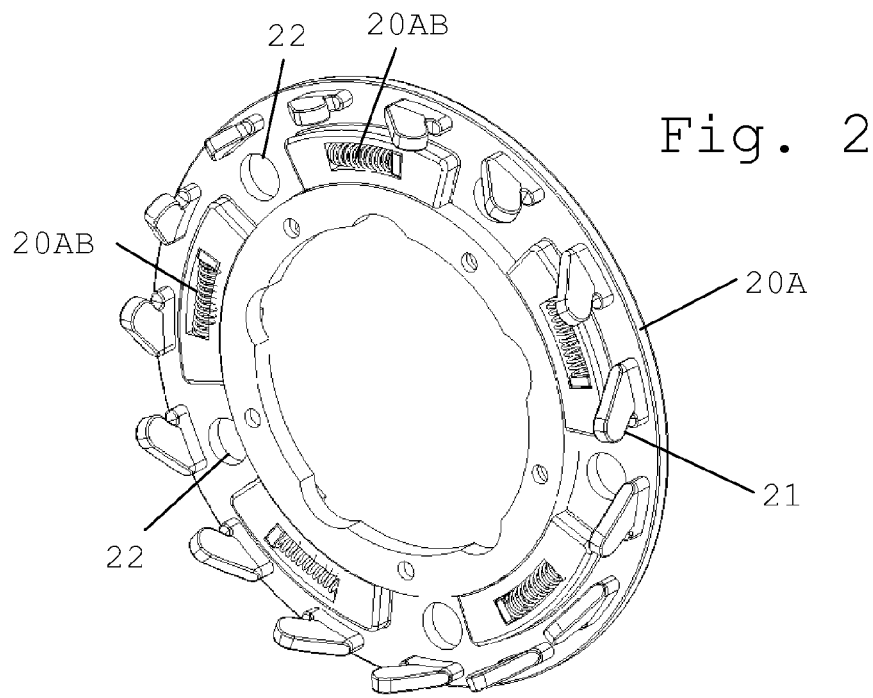
FIG. 2 illustrates a perspective view from below of a top (second) engagement arrangement of a top (second) part of the unit of FIG. 1.
Figure 3:
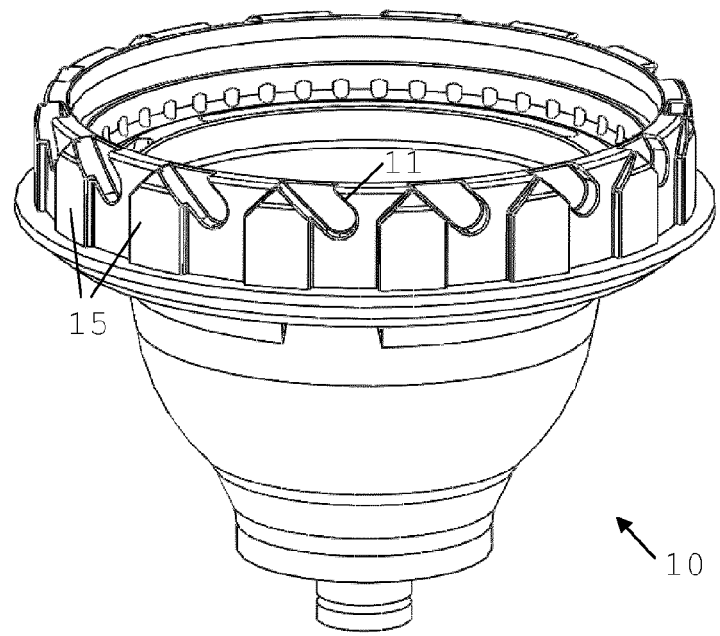
FIG. 3 illustrates a perspective side and top view of a bottom (first) part of the unit of FIG. 1 having a bottom (first) engagement arrangement.

Engaging and the pre-positioning bodies 20A,20B can be angularly biased into a relative angular orientation for guiding said mutual engagement, in particular biased by one or more springs 20AB, such as helical springs, and/or by other elastically deformable elements. Hence, when the two parts 10,20 are spaced apart, e.g. as illustrated in FIGS. 1 and 4a, engaging arrangements 11,21 are biased into alignment for engagement when indexes 15,25 have properly oriented parts 10,20 as illustrated in FIG. 5a.

First part 10 and second part 20 may have angled or tapered first and second indexes 15,25, e.g. arrow-like or triangular-like indexes, and correspondingly counter-shaped indexes 25,15. Preferably, a plurality of indexes 15,25 are provided corresponding to a plurality of possible angular pre-positionings for guiding the mutual engagements. Hence, proper relative angular positioning of first and second parts 10,20 can be achieved geometrically by indexes 15,25.

Piercing device 20C may be assembled to and held by second part 20. Device 20C can have at least one piercing element 29 that is off axis 1' and that is angularly fixed relative to first part 10 and relative to prepositioning body 20B about axis 1' when second engagement arrangement 21 is pivotally moved relative to first engagement arrangement 11 about axis 1' between the closed and open positions (FIGS. 5a, 6a and 7a).

By avoiding rotational movements of piercing device 20C during closure of the system, rotation of engaging body 20A does not drive in rotation piercing device 20C whereby receptacle 2 is not subjected to annular tearing by peripherally arranged piercers 29 when they pierce receptacle 2.

For instance, piercing device 20C has a plurality of off axis 1' piercing elements 29 for piercing receptacle 2. Such piercing elements 29 may be in an annular arrangement about axis 1' and in a regular angularly spaced-apart relationship relative to axis 1'.

Piercer 29 may form an outlet opening in ingredient receptacle 2.

Piercing device 20C may have a central piercing element 27 extending along axis 1'. Central piercing element 27 can comprise a channel 28 for guiding a liquid into receptacle 2.

As illustrated, receptacle holding unit 1 may further comprise a locking device 22,32 movable between a locked position for locking fastening device 11,21 in the fastened configuration (FIGS. 7 and 7a) and an unlocked position (FIGS. 6 and 6a) for unlocking fastening device 11,21 permitting unfastening of first and second parts 10,20, e.g. by permitting relative rotational movement of first and second engagements arrangements 11,21 and engagement and disengagement thereof. Actuator 30 may be movable along axis 1' to actuate fastening device 11,21 into the fastened configuration (FIGS. 6 and 6a) and then to drive locking device 22,32 into the locked position. Actuator 30 can be assembled to or be integral with part 32 of locking device 22,32.

Typically, the locking of a relative rotation movement between first and second parts 10,20 in the closed position prevents axial separation of first and second parts 10,20, i.e. separation of first and second parts 10,20 along the direction of axis 1' of relative rotation.

Locking device can include a locking member 32 that blocks rotational relative movements by intercepting a locking opening 22. Locking member 32 may be part of or integral with actuator 30. Inverting the locking member and the locking opening is also possible.

Locking member 32 can be actuated into the locking and/or unlocking position manually, e.g. by pushing or pulling locking member 32, or automatically, e.g. by actuating locking member 32 by a motor (not shown) for instance via a mechanical transmission (not shown).

Typically, locking member 32 is arranged to intercept in the locked position (FIG. 7) at least second part 20, e.g. second engagement arrangement 21 of second part 20, to prevent relative rotation thereof in the closed position. Locking member 32 and second part 20 may include pin 32 and cooperating opening 22, respectively, or vice versa, pin 32 entering opening 22 to lock second part 20 in rotation about axis 1' relative to locking member 32 and first part 10.

Locking member 32 may be arranged to intercept in the locked position (FIG. 7) at least engaging body 20A,22 to angularly block: engaging body 20A,21; prepositioning body 20B,25; and first part 10 via indexes 15 and engaging surfaces 11, so as to prevent relative rotation of first and second parts 10,20 in the locked position.

Locking member 32 can be movable between the locking position (FIG. 7) and the unlocking position (FIG. 6) along a direction generally parallel to axis 1'.

Actuator 30 may be configured to relatively drive via locking member 32 first and second parts 10,20 into the closed and/or open positions as illustrated in the sequence shown in FIGS. 4 to 6a. For example, locking member 32 is used to push second member 20 during the closing movement, in particular opening 22 and locking member 32 are non-aligned until the closed position is reached (FIG. 6) so that locking member 32 pushes second member 20.

During the re-opening movement, actuator 30 may be used to pull second part 20, for example via one or more appropriate traction arms 26 extending between locking member 30 and second part 20. Traction arm 26, for instance fixed to or integral with second part 20, may allow small axial movements of locking member 32 relative to second part 20 to permit a locking movement of locking member 32 between the locking position (FIG. 7) and the unlocking position (FIG. 6).

Figure 5:
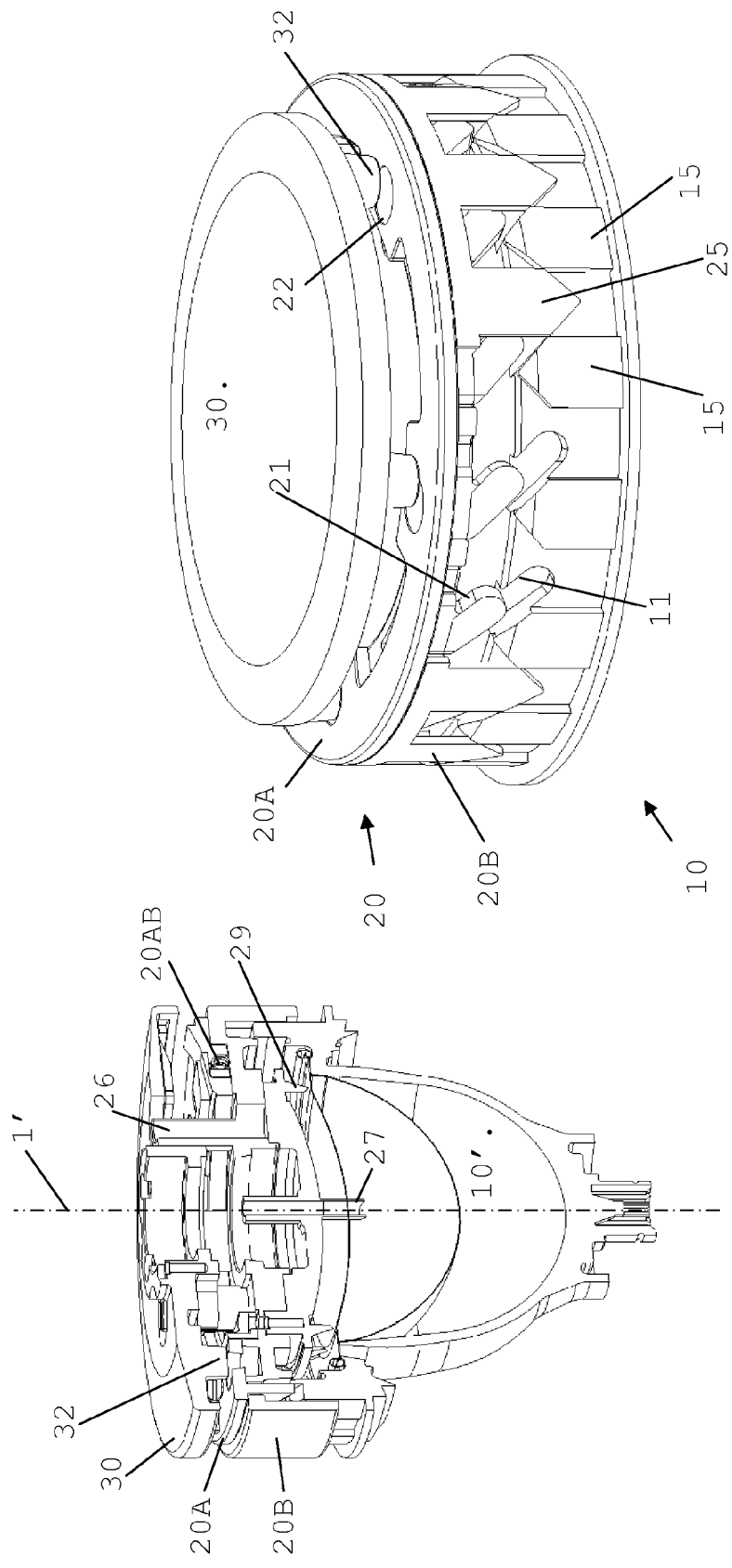
Figure 6:
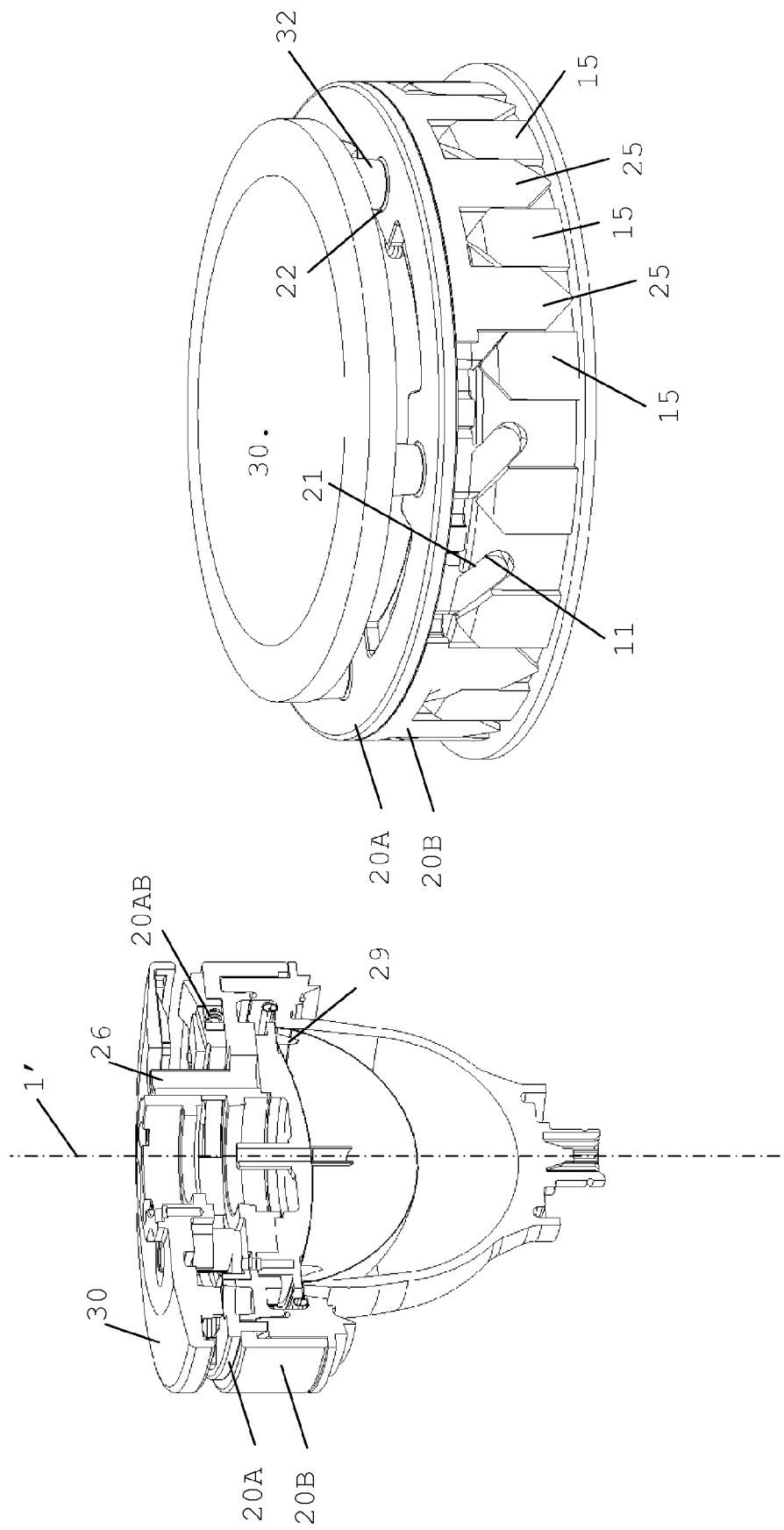
Figures 7, 7A:
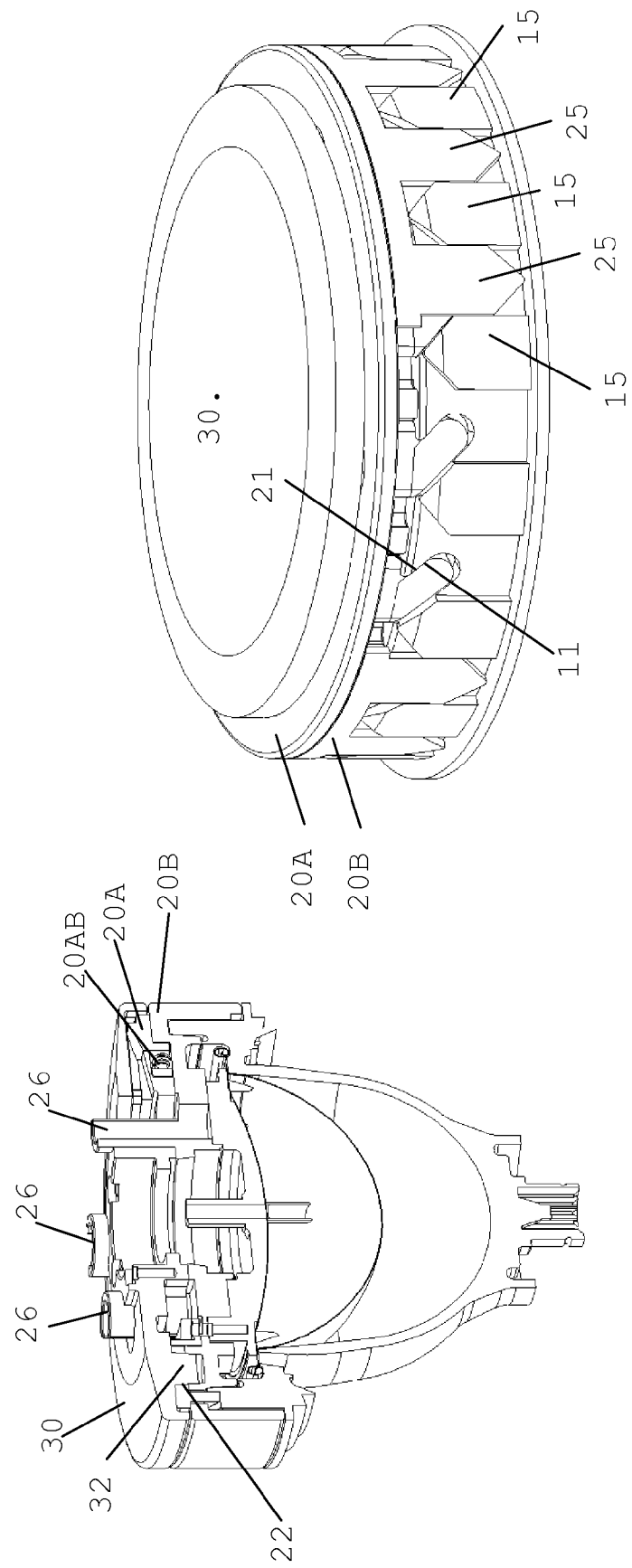

Hence, actuator 30 can be driven in a single linear (straight) movement, e.g. along axis 1' of relative rotation of first and second engagement surfaces 11,21, first to bring first and second parts 10,20 of holding unit 1 together, as illustrated in the sequence of FIGS. 4 to 6, and then to drive engagement arrangements 11,21 in relative rotation into the closed position as illustrated in the sequence of FIGS. 6 and 7.

As in the illustrated particular embodiment, actuator 30 may be movable reversibly along straight axis 1' for actuation and driving of first and second parts 10,20 and fastening arrangement 11,21 reversely, and, optionally, of piercing device 20C and of locking device 22,32 reversely. Actuator 30 may be driven in a single linear movement along axis 1', first to disengage engagement arrangements 11,21 by relative rotation thereof and then to separate first and second parts 10,20 of holding unit 1.

Thus, a single axial straight movement of actuator 30 can be sufficient to bring first and second parts 10,20 together (FIGS. 4 to 5), engage engagement arrangements 11,21 (FIGS. 5 to 6) and lock engagement arrangements 11,21 in the closed position (FIGS. 6 to 7). Likewise, a single axial movement of actuator 30 may be appropriate to unlock engagement arrangements 11,21, to disengage engagement arrangements 11,21 and to separate first and second parts 10,20.

Actuator 30 can thus be used for bringing receptacle holding unit 1 from a configuration for inserting and/or removing an ingredient receptacle 2 to a configuration for processing ingredient receptacle 2 to prepare a beverage, and/or vice versa.

Moreover, actuator 30 can be located away from any receptacle 2 in holder unit 1, e.g. on the outside of the first and second parts 10,20, so that actuator 30 is not, or substantially not, exposed to any fluid or pressure rise associated with the processing of receptacle 2 in holder unit 1. Thus, in such a case, actuator 30 is not noticeably exposed to any change of condition or mechanical stress due to the processing conditions of ingredient receptacle 2.

Receptacle holding unit 1 is typically integrated into a beverage preparation machine as discussed above.

Receptacle 2 containing a beverage ingredient may be used in a receptacle holding unit 1 as illustrated for preparing a beverage from the ingredient of receptacle 2.

Such a receptacle holding unit 1 may be static or dynamic during beverage preparation. For instance, receptacle holding unit 1 is arranged to rotate, e.g. centrifuged, in particular at elevated speed, e.g. above 1000 or 2000 RPM, to enhance processing of the ingredient in receptacle 2, in particular mixing thereof with a liquid circulated into receptacle 2. In the latter configuration, first and second parts 10,20 move together during beverage preparation in a manner to be angularly fixed one to another about axis 1' of relative rotation into and out of the connection configuration. Axis 1' of relative rotation of first and second parts 10,20 may be the same as or different to the axis of ingredient processing rotation of parts 10,20. For instance, parts 10,20 are rotated about axis 1' during beverage preparation by driving part 10 or part 20 by a motor, in particular into the direction of engagement of engagement arrangements 11,21 to enhance closure of parts 10,20. Typically, a motor (not shown) drives part 10 in rotation about axis 1', e.g. via connector 12. In the configuration shown in FIG. 1, the motor can drive part about axis 1' in the clockwise direction to urges engagement arrangements 11,21 into the direction of mutual engagement.

Receptacle 2 may be in the form of a capsule that has a flange 2", e.g. a rim, that can be secured inbetween first and second parts 10,20. The capsule may have a body 2' that is, symmetric or asymmetric, conical or frusto-conical or cylindrical or spherical or hemispherical or frusto-spherical, containing the ingredient, e.g. ground coffee, tea or cacao or another beverage ingredient.

The invention claimed is:

1. A receptacle holding unit for a device for preparing a beverage from an ingredient contained in a receptacle comprising:
   a first part;
   a second part that is movable towards the first part into a closed position for holding the receptacle in such unit and relatively apart from the first part into an open position for inserting the receptacle into such unit and/or for removal therefrom;
   a fastening device having a fastened configuration for fastening together the first and second parts in the closed position and an unfastened configuration such to enable movement of the first and second parts out of the closed configuration;
   an actuator movable between an open configuration and a closed configuration to drive the second part between the open and the closed positions relative to the first part; and
   the actuator is movable along a straight axis to drive the first part and the second part into the closed position and further movable along the axis to actuate the fastening device from the unfastened configuration to the fastened configuration.

2. The unit of claim 1, comprising a piercing device driven by the actuator for piercing the receptacle.

3. The unit of claim 2, wherein the actuator is movable along the straight axis to drive the piercing device for piercing the receptacle and then to drive the second part into the closed position relative to the first part.

4. The unit of claim 2, wherein the piercing device is assembled to and held by the second part.

5. The unit of claim 1, wherein the fastening device has:
   a first engagement arrangement assembled to or integral with the first part; and
   a second engagement arrangement assembled to or integral with the second part,
   the first and second engagement arrangements being relatively rotated about the axis when driven by the actuator moving along the axis for mutual engagement and disengagement of the engagement arrangements.

6. The unit of claim 5, wherein the first part bearing the first engagement arrangement comprises a first index and the second part comprises an assembly of:
   a pre-positioning body that bears a second index; and
   an engaging body that bears the second engagement arrangement and that is pivotally mounted to the pre-positioning body,
   the first index cooperating with the second index for pre-orienting the second engagement arrangement relative to the first engagement arrangement to guide mutual engagement thereof at closure of the first and second parts.

7. The unit of claim 5, comprising a piercing device assembled to and held by the second part, the device having at least one piercing element that is off the axis and that is angularly fixed relative to the first part, and/or when present relative to the prepositioning body, about the axis when the second engagement arrangement is pivotally moved relative to the first engagement arrangement about the axis between the closed and open positions.

8. The unit of claim 6, wherein the piercing device is angularly fixed to the per-positioning body about the axis between the open and closed positions.

9. The unit of claim 1, comprising a piercing device that has a plurality of off the axis piercing elements for piercing the receptacle, such piercing elements being in an annular arrangement about the axis and/or in a regular angularly spaced-apart relationship relative to the axis.

10. The unit of claim 1, comprising a piercing device that has a piercing element for guiding a liquid into the receptacle and/or out thereof.

11. The unit of claim 1, comprising a locking device movable between a locked position for locking the fastening device in the fastened configuration and an unlocked position for unlocking the fastening device for unfastening the first and second parts.

12. The unit of claim 11, wherein the actuator is movable along the axis to actuate the fastening device into the fastened configuration and then to drive the locking device into the locked position.

13. The unit of claim 1, wherein the actuator is movable reversibly along the straight axis for actuation and driving of the second part and the fastening arrangement reversely.

14. A beverage preparation device comprising a receptacle holding unit comprising:
   a first part,
   a second part that is movable towards the first part into a closed position for holding the receptacle in such unit and relatively apart from the first part into an open position for inserting the receptacle into such unit and/or for removal therefrom,
   a fastening device having a fastened configuration for fastening together the first and second parts in the closed position and an unfastened configuration such to enable movement of the first and second parts out of the closed configuration,
   an actuator movable between an open configuration and a closed configuration to drive the first part and the second part between the open and the closed positions, and the actuator is movable along a straight axis to drive the second part into the closed position relative to the first part and further movable along the axis to actuate the fastening device from the unfastened configuration to the fastened configuration.

15. A method for preparing a beverage comprising using a receptacle containing a beverage ingredient for a receptacle holding unit, the method comprising:
   moving a second part towards the first part into a closed position for holding the receptacle in such unit and relatively apart from the first part into an open position for inserting the receptacle into such unit and/or for removal therefrom, moving a fastening device into a fastened configuration in which the first and second parts are fastened together in the closed position and an unfastened configuration to enable movement of the first and second parts out of the closed configuration, moving an actuator between an open configuration and a closed configuration to drive the second part between the open and the closed positions relative to the first part, and the actuator moves along a straight axis to drive the first part and the second part into the closed position and further moves along the axis to actuate the fastening device from the unfastened configuration to the fastened configuration, and preparing the beverage from the beverage ingredient by passing a liquid through the receptacle held by the second and first parts in the closed position.

* * * * *